(12) United States Patent
Liu et al.

(10) Patent No.: US 9,958,945 B1
(45) Date of Patent: May 1, 2018

(54) LINEAR RESONANT ACTUATOR WITH ELASTIC SUSPENSION SYSTEM

(71) Applicant: TOPRAY MEMS INC., Hsinchu (TW)

(72) Inventors: Chin-Sung Liu, Hsinchu (TW); Hsiao-Ming Chien, Hsinchu (TW)

(73) Assignee: TOPRAY MEMS INC., Hsinchu (TW)

( * ) Notice: Subject to any disclaimer, the term of this patent is extended or adjusted under 35 U.S.C. 154(b) by 0 days. days.

(21) Appl. No.: 15/630,432

(22) Filed: Jun. 22, 2017

(30) Foreign Application Priority Data

May 19, 2017 (TW) .............................. 106207187 U

(51) Int. Cl.
  *G06F 3/01* (2006.01)
  *H02N 2/02* (2006.01)
  *G08B 6/00* (2006.01)

(52) U.S. Cl.
  CPC .............. *G06F 3/016* (2013.01); *G08B 6/00* (2013.01); *H02N 2/02* (2013.01)

(58) Field of Classification Search
  CPC ........ H02N 2/025; H02N 2/126; H02N 2/186; H02N 2/123; H02N 2/043; H02N 2/046; H02N 2/006; H02N 2/0015; H02N 2/02; A01B 12/006; G06F 3/016; G08B 6/00
  See application file for complete search history.

(56) References Cited

U.S. PATENT DOCUMENTS

| 4,413,179 A * | 11/1983 | Matsuoka | B06B 1/0659 250/232 |
| 9,722,168 B2 * | 8/2017 | Moon | H01L 41/0533 |
| 2011/0121685 A1 * | 5/2011 | Fujimoto | H01L 41/1134 310/314 |
| 2011/0163635 A1 * | 7/2011 | Kim | G06F 3/016 310/328 |
| 2011/0260995 A1 * | 10/2011 | Woo | G06F 3/016 345/173 |
| 2013/0208573 A1 * | 8/2013 | Arimatsu | G04C 9/02 368/47 |
| 2014/0070667 A1 * | 3/2014 | Oh | B06B 1/0644 310/326 |
| 2014/0145560 A1 * | 5/2014 | Park | H01L 41/0933 310/323.01 |
| 2014/0285064 A1 * | 9/2014 | Kim | B06B 1/0644 310/317 |

(Continued)

*Primary Examiner* — Hai Phan
*Assistant Examiner* — Son M Tang
(74) *Attorney, Agent, or Firm* — Rabin & Berdo, P.C.

(57) ABSTRACT

A linear vibration actuator is provided, comprising a movable structure, a coil and an elastic suspension system. The elastic suspension system comprises a first and a second elastic sheets, and the first and second elastic sheet respectively comprising a first and a second fixed portions, a first and a second suspension portions, and a first and a second engaging portions. Both first and second suspension portions comprise a bend with an angle greater than 90°. The elastic suspension system enables the simple harmonic motion of the movable structure approximating a parallel motion to improve vibration effect without increasing current outputted to the coil, so as to reduce temperature and power consumption of the present invention. As a result, the present invention is able to provide superior vibration effect to portable electronic product and solve the overheating and power consumption problems.

12 Claims, 6 Drawing Sheets

(56) References Cited

U.S. PATENT DOCUMENTS

| | | | |
|---|---|---|---|
| 2014/0346924 A1* | 11/2014 | Son ................... | B06B 1/0603 310/317 |
| 2014/0346926 A1* | 11/2014 | Choi .................. | H02N 2/006 310/323.01 |
| 2015/0188455 A1* | 7/2015 | Oh ..................... | H01L 41/053 310/317 |
| 2015/0206639 A1* | 7/2015 | Odajima ............. | H01F 7/10 335/235 |
| 2015/0214463 A1* | 7/2015 | Moon ................. | H01L 41/0533 310/345 |
| 2015/0214467 A1* | 7/2015 | Han ................... | B06B 1/10 310/323.01 |
| 2015/0236240 A1* | 8/2015 | Park .................. | H01L 41/053 310/323.01 |
| 2015/0236241 A1* | 8/2015 | Moon ................. | B06B 1/12 310/323.01 |
| 2015/0318463 A1* | 11/2015 | Son ................... | H01L 41/053 310/321 |
| 2015/0333699 A1* | 11/2015 | Kim ................... | G06F 3/041 345/173 |

* cited by examiner

LINEAR RESONANT ACTUATOR WITH ELASTIC SUSPENSION SYSTEM

CROSS-REFERENCE TO RELATED APPLICATION

The present application is based on, and claims priority form, Taiwan Patent Application No. 106207187, filed May 19, 2017, the disclosure of which is hereby incorporated by reference herein in its entirety.

TECHNICAL FIELD

The technical field generally relates to a linear resonant actuator (LRA), and in particular, to an LRA with elastic suspension system.

BACKGROUND

From the vibration in the early game handles to the modern portable electronic products, such as, mobile phones or tablet PC, the vibration is generated by the built-in actuators. The early actuators mostly used an eccentric rotating mass (ERM) motor to provide vibration. The vibration function not only provides a reminder when the product is in mute mode, but also as a feedback mechanism in the use of keypad-free operation. The vibration feedback allows the user to feel a slight vibration when using the electronic product equipped with the actuator, prompting the user to complete the interactive operation.

The ERM motor is known to show the drawbacks of slow response, high power consumption, complex structure and easy to damage, and in recent years, with the emergence demand on fast response and low power consumption, the linear resonant actuator (LRA) has replaced the ERM motor to become the mainstream choice to provide the vibration function in portable electronic devices. The main reason is because the LRA uses the Lorentz force generated by electromagnetic effects to drive the movable part in a simple harmonic motion to cause vibration. Compared with the ERM motor, the LRA has the advantages of faster response, lower power consumption, simpler structure and more durable.

The conventional LRA comprises a movable structure, a coil, a elastic suspension system and a housing. The movable structure comprises a magnetic-permeable element, and two magnets. The two magnets are disposed respectively at two opposite sides of the magnetic-permeable element. The coil is fixed to the housing and surrounds the magnetic-permeable element. The elastic suspension system comprises two elastic sheets, with each elastic sheet having a fixed portion, a suspension portion and an engaging portion. The fixed portion of each elastic sheet is fixed to the housing, and the suspension portion is disposed between the fixed portion and the engaging portion. The engaging portion of each elastic sheet is engaged respectively to one side of the magnet away from the magnetic-permeable element. When a continuous alternating current (A/C) current flows through the coil, according to Fleming's left-hand law, the Lorentz force generated by the electromagnetic effect drives the movable structure to move in a first direction with respect to the coil; when the current direction changes, the movable structure moves in a second direction with respect to the coil opposite to the first direction; therefore, a simple harmonic motion (SHM) is generated. The elastic suspension system keeps the movable structure within a fixed range and creates vibration sensation of different frequencies. When the coil is powered off, the elastic suspension system returns the movable structure to the original position.

In general, the vibration effect provided by the LRA to the portable electronic product in parallel movement is superior to that provided in the left and right swing motion. However, the suspension portion of each elastic sheet of the elastic suspension system in the conventional LRA has only one bend and the angle at the bend is equal to or less than 90°, resulting in that the movable structure, in a simple harmonic motion, is actually performing a left-and-right swing with the fixed portions of the two elastic sheets as fulcrums, instead of a parallel movement, which reduces vibration effect and leads to the vibration effect provided to the portable electronic product less than expected.

In order to solve the above problems, a general approach is to directly increase the current to the coil to enhance the vibration effect of the LRA. However, this approach will lead to a significant increase in the temperature and power consumption of the LRA, which leads to the problem of overheating and power consumption for portable electronic products with LRA.

SUMMARY

The primary object of the present invention is to provide a linear vibration actuator with elastic suspension system. The elastic suspension system enables the simple harmonic motion of movable structure approximate to parallel motion by using a plurality of bends with obtuse angles (i.e., greater than 90°), to enhance vibration effect without increasing current outputted to the coil so as to reduce the temperature and power consumption of the present invention. As a result, the present invention is able to provide superior vibration effect to portable electronic product and solve the overheating and power consumption problems.

To achieve the aforementioned object, the present invention provides a linear resonant actuator (LRA) with elastic suspension system, comprising: a movable structure, a coil, and an elastic suspension system.

The movable structure comprises a magnetic-permeable element and two magnets, with the two magnets disposed at two opposite sides of the magnetic-permeable element.

The coil surrounds the magnetic-permeable element.

The elastic suspension system comprises: a first elastic sheet and a second elastic sheet; the first elastic sheet comprising a first fixed portion, a first suspension portion and a first engaging portion, the first suspension portion being disposed between the first fixed portion and the first engaging portion and comprising a plurality of bends, the bends of the first suspension portion being greater than 90°, and the first engaging portion being disposed at one end of the movable structure; the second elastic sheet comprising a second fixed portion, a second suspension portion and a second engaging portion, the second suspension portion being disposed between the second fixed portion and the second engaging portion and comprising a plurality of bends, the bends of the second suspension portion being greater than 90°, and the second engaging portion being disposed at the other end of the movable structure.

Preferably, the first elastic sheet and the second elastic sheet are symmetrical.

Preferably, the first suspension portion comprises: a first outward extension and a first inward extension; the first outward extension extending outwards between the first fixed portion and the first inward extension, with a bend between the first outward extension and the first fixed portion; the first inward extension extending inwards between the first outward extension and the first engaging portion, with a bend between the first outward extension and the first inward extension; the second suspension portion comprises: a second outward extension and a second inward extension; the second outward extension extending outwards between the second fixed portion and the second inward extension, with a bend between the second outward extension and the second fixed portion; the second inward extension extending inwards between the second outward extension and the second engaging portion, with a bend between the second outward extension and the second inward extension; wherein the angle at the bend between the first outward extension and the first fixed portion is equal to the angle at the bend between the second outward extension and the second the fixed portion; the angle at the bend between the first outward extension and the first inward extension is equal to the angle at the bend between the second outward extension and the second inward extension.

Preferably, the angle at the bend between the first outward extension and the first fixed portion is greater than the angle at the bend between the first outward extension and the first inward extension; the angle at the bend between the second outward extension and the second fixed portion is greater than the angle at the bend between the second outward extension and the second inward extension.

Preferably, both the angle at the bend between the first outward extension and the first fixed portion and the angle at the bend between the second outward extension and the second the fixed portion are 115°; both the angle at the bend between the first outward extension and the first inward extension and the angle at the bend between the second outward extension and the second inward extension are 95°.

Preferably, the first outward extension has a length greater than the first inward extension, the second outward extension has a length greater than the second inward extension, the first outward extension and the second outward extension have the same length, and the first inward extension and the second inward extension have the same length.

Preferably, the first suspension portion comprises: two first outward extensions and two first inward extensions; one of the first outward extensions extending outwards between the first fixed portion and the other first inward extension, with a bend between the one first outward extension and the first fixed portion; the other first outward extension extending outwards between the one first outward extension and one of the first inward extension, with a bend between the one first outward extension and the other first outward extension; one of the first inward extensions extending inwards between the other first outward extension and the other first inward extension, with a bend between the other first outward extension and the one first inward extension; the other first inward extension extending inwards between the one first outward extension and the first engaging portion, with a bend between the one first inward extension and the other first inward extension; the second suspension portion comprises: two second outward extensions and two second inward extensions; one of the second outward extensions extending outwards between the second fixed portion and the other second outward extension, with a bend between the one second outward extension and the second fixed portion; the other second outward extension extending outwards between the one second outward extension and one of the second inward extensions, with a bend between the one second outward extension and the other second outward extension; one of the second inward extension extending inwards between the other second outward extension and the other second inward extension, with a bend between the other second outward extension and the one second inward extension; the other second inward extension extending inwards between the one second inward extension and the second engaging portion, with a bend between the one second inward extension and the other second inward extension; wherein the angle at the bend between the one first outward extension and the first fixed portion is equal to the angle at the bend between the one second outward extension and the second the fixed portion; the angle at the bend between the two first outward extensions is equal to the angle at the bend between the two second outward extensions; the angle at the bend between the other first outward extension and the one first inward extension is equal to the angle at the bend between the other second outward extension and the one second inward extension; the angle at the bend between the two first inward extensions is equal to the angle at the bend between the two second inward extensions.

Preferably, both the angle at the bend between the one first outward extension and the first fixed portion and the angle at the bend between the one second outward extension and the second the fixed portion are 170°; both the angle at the bend between the two first outward extensions and the angle at the bend between the two second outward extensions are 115°; both the angle at the bend between the other first outward extension and the one first inward extension and the angle at the bend between the other second outward extension and the one second inward extension are 150°; and both the angle at the bend between the two first inward extensions and the angle at the bend between the two second inward extensions are 105°.

Preferably, the one first outward extension near the first fixed portion has a length greater than the other first outwards extension away from the first fixed portion, the one first outward extension has a length less than the one first inward extension away from the first engaging portion, the one first inward extension away from the first engaging portion has a length greater than the other first inward extension near the first engaging portion; the one second outward extension near the second fixed portion has a length greater than the other second outwards extension away from the second fixed portion, the one second outward extension has a length less than the one second inward extension away from the second engaging portion, the one second inward extension away from the second engaging portion has a length greater than the other second inward extension near the second engaging portion; wherein the one first outward extension near the first fixed portion and the one second outward extension near the second fixed portion have the same length; the other first outward extension away from the first fixed portion and the other second outward extension away from the second fixed portion have the same length; the one first inward extension away from the first engaging portion and the one second inward extension away from the second engaging portion have the same length; the other first inward extension near the first engaging portion and the other second inward extension near the second engaging portion have the same length.

Preferably, the movable structure comprises two magnet fixtures, with at least a portion of each magnet disposed in a magnet fixture respectively; each magnet fixture is disposed with a groove, and the first engaging portion and the second engaging portion are hook-shaped and embedded respectively into the grooves of the two magnet fixtures.

Preferably, the first fixed portion and the second fixed portion are disposed at the same side of the two magnet fixtures, and the two grooves are disposed respectively at a side of the two magnet fixtures away from the first fixed portion and the second fixed portion.

Preferably, the first fixed portion and the second fixed portion are integrated monolithically.

Preferably, each magnet fixture is disposed with a holding slot, and outer sides of the two magnets are accommodated respectively in the holding slots of the two magnet fixtures.

Preferably, the movable structure comprises a magnet base, disposed on top of the magnetic-permeable element and the two magnets, with outer side accommodated respectively in the holding slot of the two magnet fixtures.

The advantages of the present invention include: in the simple harmonic motion of the movable structure, the elastic suspension system enables the simple harmonic motion of the movable structure approximating a parallel motion to improve vibration effect without increasing current outputted to the coil, so as to reduce temperature and power consumption of the present invention. As a result, the present invention is able to provide superior vibration effect to portable electronic product and solve the overheating and power consumption problems.

The foregoing will become better understood from a careful reading of a detailed description provided herein below with appropriate reference to the accompanying drawings.

BRIEF DESCRIPTION OF THE DRAWINGS

The embodiments can be understood in more detail by reading the subsequent detailed description in conjunction with the examples and references made to the accompanying drawings, wherein.

DETAILED DESCRIPTION OF THE DISCLOSED EMBODIMENTS

Figure 1:
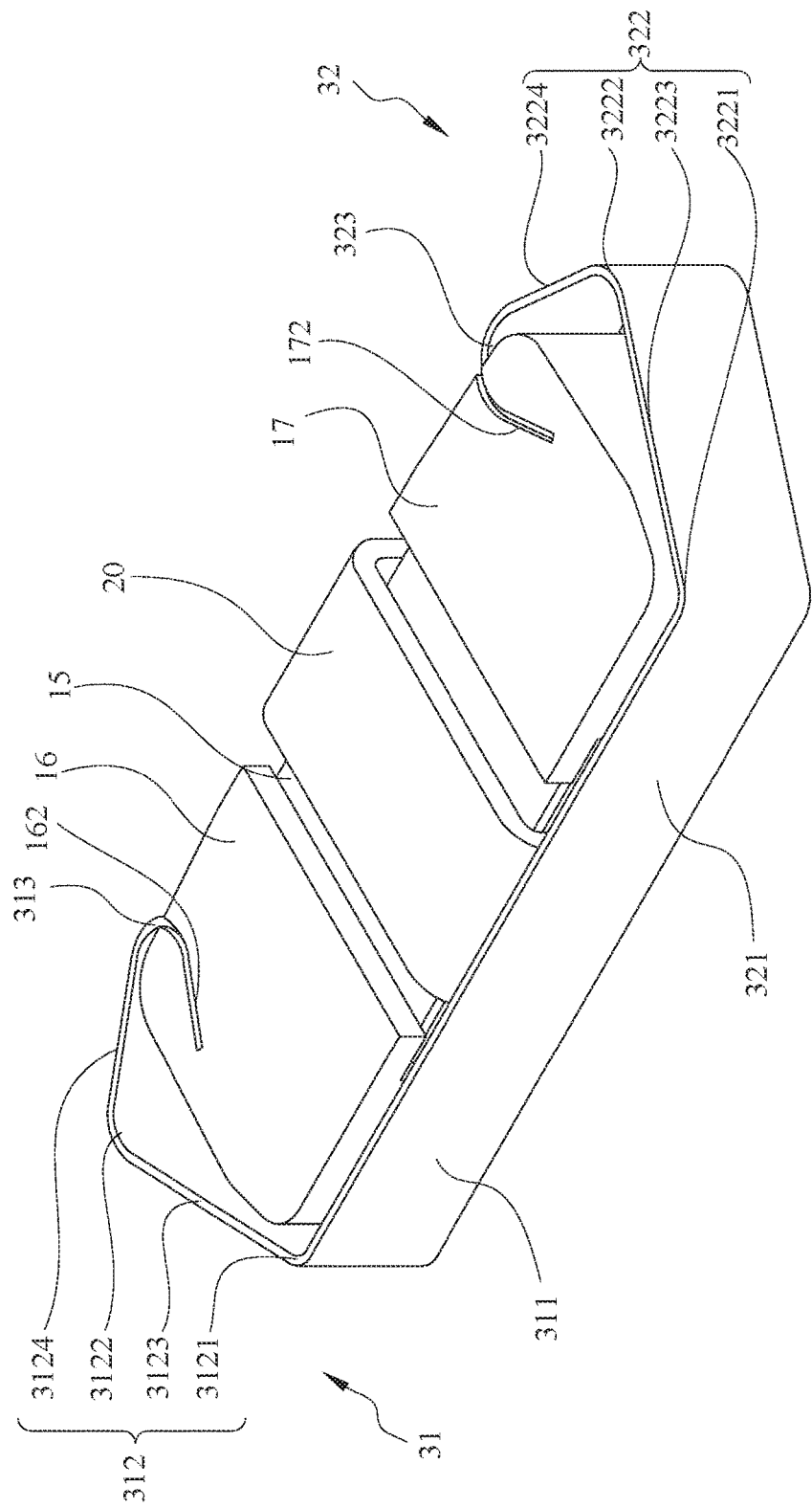
FIG. 1 shows a schematic view of the linear resonant actuator with elastic suspension system in accordance with a first exemplary embodiment.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
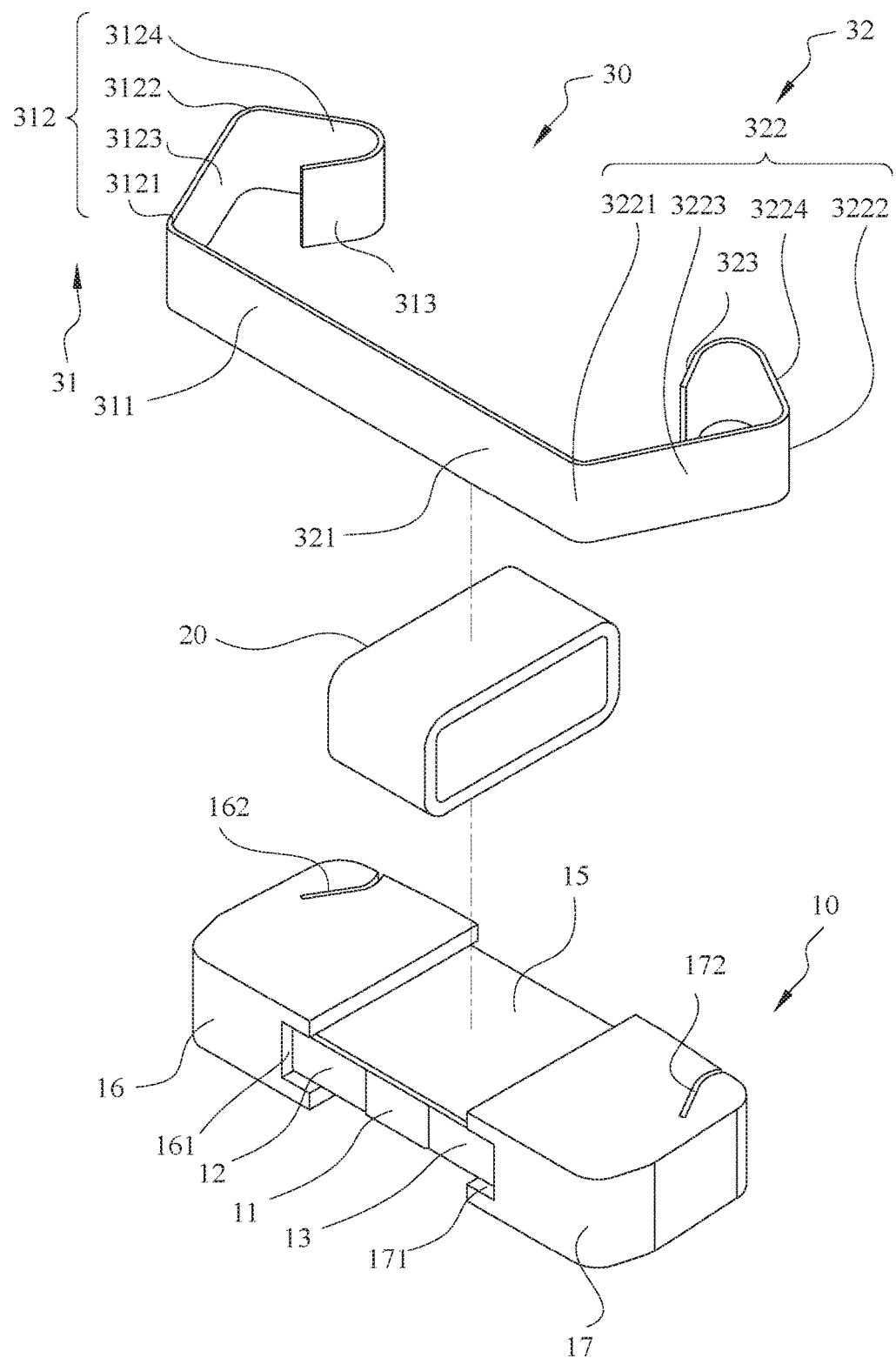
FIG. 2 shows a dissected view of the linear resonant actuator with elastic suspension system in accordance with a first exemplary embodiment.
Figure 3:
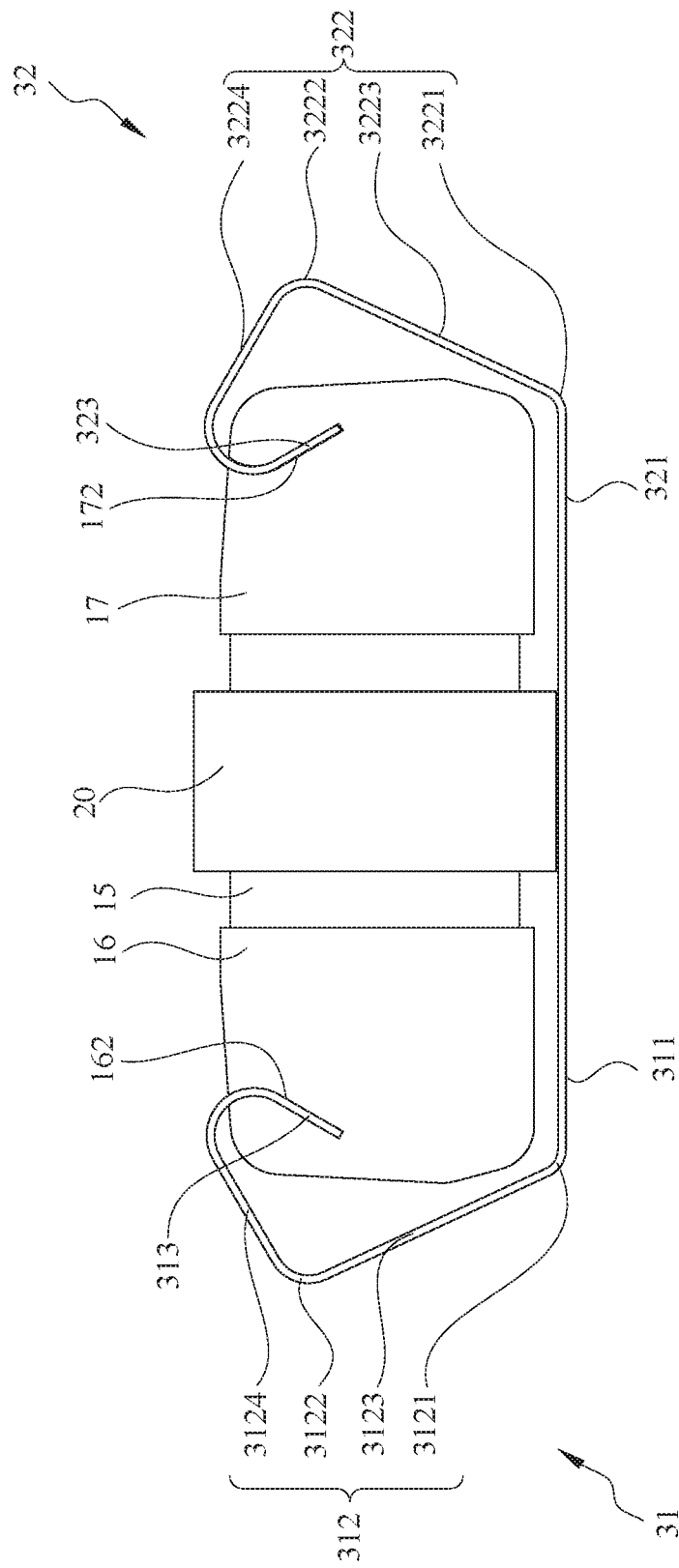
FIG. 3 shows a side view of the linear resonant actuator with elastic suspension system in accordance with a first exemplary embodiment.

Refer to FIGS. 1-3. FIG. 1 shows a schematic view of the linear resonant actuator with elastic suspension system in accordance with a first exemplary embodiment; FIG. 2 shows a dissected view of the linear resonant actuator with elastic suspension system in accordance with a first exemplary embodiment; and FIG. 3 shows a side view of the linear resonant actuator with elastic suspension system in accordance with a first exemplary embodiment. The present invention provides a linear resonant actuator with elastic suspension system, comprising movable structure 10, a coil 20, and a elastic suspension system 30.

The movable structure 10 comprises a magnetic-permeable element 11, and two magnets 12, 13, with the two magnets 12, 13 disposed at two opposite sides of the magnetic-permeable element 11. Specifically, the magnetic-permeable element 11 is a yoke and has a cuboid shape, and the two magnets 12, 13 are disposed respectively at the two longer sides of the magnetic-permeable element 11. Preferably, the movable structure 10 further comprises a magnet base 15, and two magnet fixtures 16, 17; the magnet base 15 is disposed on top of the magnetic-permeable element 11 and the two magnets 12, 13; at least a portion of the magnet base 15 and at least portion of the two magnets 12, 13 are disposed inside the two magnet fixtures 16, 17. More specifically, each magnet fixture 16, 17 is disposed with a holding slot 161, 171, the outer side of the magnet base 15 and the outer sides of the two magnets are accommodated respectively inside the holding slots 161, 171 of the magnet fixtures 16, 17 and outer sides of the two magnets are accommodated respectively in the holding slots of the two magnet fixtures. In the present invention, the outer side of the magnet base 15 is the two ends of the magnet base 15 along the length direction, and the out sides of the two magnets 12, 13 are the sides of the magnets 12, 13 away from the magnetic-permeable element 11. Moreover, each magnet fixture 16, 17 is disposed with a groove 162, 172 respectively, located at the same side on the magnets 12, 13.

The coil 20 surrounds the magnetic-permeable element 11. Specifically, the coil 20 is fixed to a housing (not shown), electrically connected to a power source and maintaining a distance from the magnetic-permeable element 11 to avoid contacting the magnetic-permeable element 11.

The elastic suspension system 30 comprises: a first elastic sheet 31 and a second elastic sheet 32; the first elastic sheet 31 comprising a first fixed portion 311, a first suspension portion 312 and a first engaging portion 313, the second elastic sheet 32 comprising a second fixed portion 321, a second suspension portion 322 and a second engaging portion 323. The first fixed portion 311 and the second fixed portion 321 are fixedly disposed inside the housing (not shown), and located at the same side as the two magnet fixtures 16, 17, and the two grooves 162, 172 are disposed respectively at a side of the two magnet fixtures 16, 17 away from the first fixed portion 311 and the second fixed portion 321. Preferably, the first fixed portion 311 and the second fixed portion 321 are integrated monolithically. The first suspension portion 312 is disposed between the first fixed portion 311 and the first engaging portion 313 and comprises a plurality of bends 3121, 3122, the bends 3121, 3122 of the first suspension portion 312 are greater than 90°. The second suspension portion 322 is disposed between the second fixed portion 321 and the second engaging portion 323 and comprises a plurality of bends 3221, 3222, the bends 3221, 3222 of the second suspension portion 322 greater than 90°. The first engaging portion 313 is disposed at one end of the movable structure 10; and the second engaging portion 323 is disposed at the other end of the movable structure 10. Specifically, the first engaging portion 313 and the second engaging portion 313 are hook-shaped and embedded respectively into the grooves 162, 172 of the magnet fixtures 16, 17.

Moreover, the first elastic sheet 31 and the second elastic sheet 32 are symmetrical. In the present embodiment, the first suspension portion 312 comprises: a first outward extension 3123 and a first inward extension 3124; the first outward extension 3123 extending outwards between the first fixed portion 311 and the first inward extension 3124, with a bend 3121 between the first outward extension 3123 and the first fixed portion 311; the first inward extension 3124 extending inwards between the first outward extension 3123 and the first engaging portion 313, with a bend 3122 between the first outward extension 3123 and the first inward extension 3124; the second suspension portion 322 comprises: a second outward extension 3223 and a second inward extension 3224; the second outward extension 3223 extending outwards between the second fixed portion 321 and the second inward extension 3224, with a bend 3221 between the second outward extension 3223 and the second fixed portion 321; the second inward extension 3224 extending inwards between the second outward extension 3223 and the second engaging portion 323, with a bend 3222 between the second outward extension 3223 and the second inward extension 3224. Wherein the angle at the bend 3121 between the first outward extension 3123 and the first fixed portion 311 is equal to the angle at the bend 3221 between the second outward extension 3223 and the second the fixed portion 321; the angle at the bend 3122 between the first outward extension 3123 and the first inward extension 3124 is equal to the angle at the bend 3222 between the second outward extension 3223 and the second inward extension 3224. Wherein, the angle at the bend 3121 between the first outward extension 3123 and the first fixed portion 311 is greater than the angle at the bend 3122 between the first outward extension 3123 and the first inward extension 3124; the angle at the bend 3221 between the second outward extension 3223 and the second fixed portion 321 is greater than the angle at the bend 3222 between the second outward extension 3223 and the second inward extension 3224. Preferably, both the angle at the bend 3121 between the first outward extension 3123 and the first fixed portion 311 and the angle at the bend 3221 between the second outward extension 3223 and the second the fixed portion 321 are 115°; both the angle at the bend 3122 between the first outward extension 3123 and the first inward extension 3124 and the angle at the bend 3222 between the second outward extension 3223 and the second inward extension 3224 are 95°. Preferably, the first outward extension 3123 has a length greater than the first inward extension 3124, the second outward extension 3223 has a length greater than the second inward extension 3224, the first outward extension 3123 and the second outward extension have the same length 3223, and the first inward extension 3124 and the second inward extension 3224 have the same length.

When the coil 20 is continuously inputted with electrical current in positive and reverse directions, the current through the coil 20 can interact with the magnetic field passing through the two magnets 12, 13. According to the Fleming's left-hand law, a force called Lorentz force is generated to push the movable structure 30 to move back and forth in simple harmonic motion with respect to the coil 20. During the simple harmonic motion of the movable structure 10, since the first suspension portion 312 of the first elastic sheet 31 of the elastic suspension system 30 comprises a plurality of bends with angles all greater than 90°, and the second suspension portion 322 of the second elastic sheet 32 of the elastic suspension system 30 comprises a plurality of bends with angles all greater than 90°, the elastic suspension system 30 can cause the simple harmonic motion of the movable structure 10 to approximate a parallel motion to improve vibration effect without increasing current outputted to the coil, so as to reduce temperature and power consumption of the present invention. As a result, the present invention is able to provide superior vibration effect to portable electronic product and solve the overheating and power consumption problems.

Figure 4:
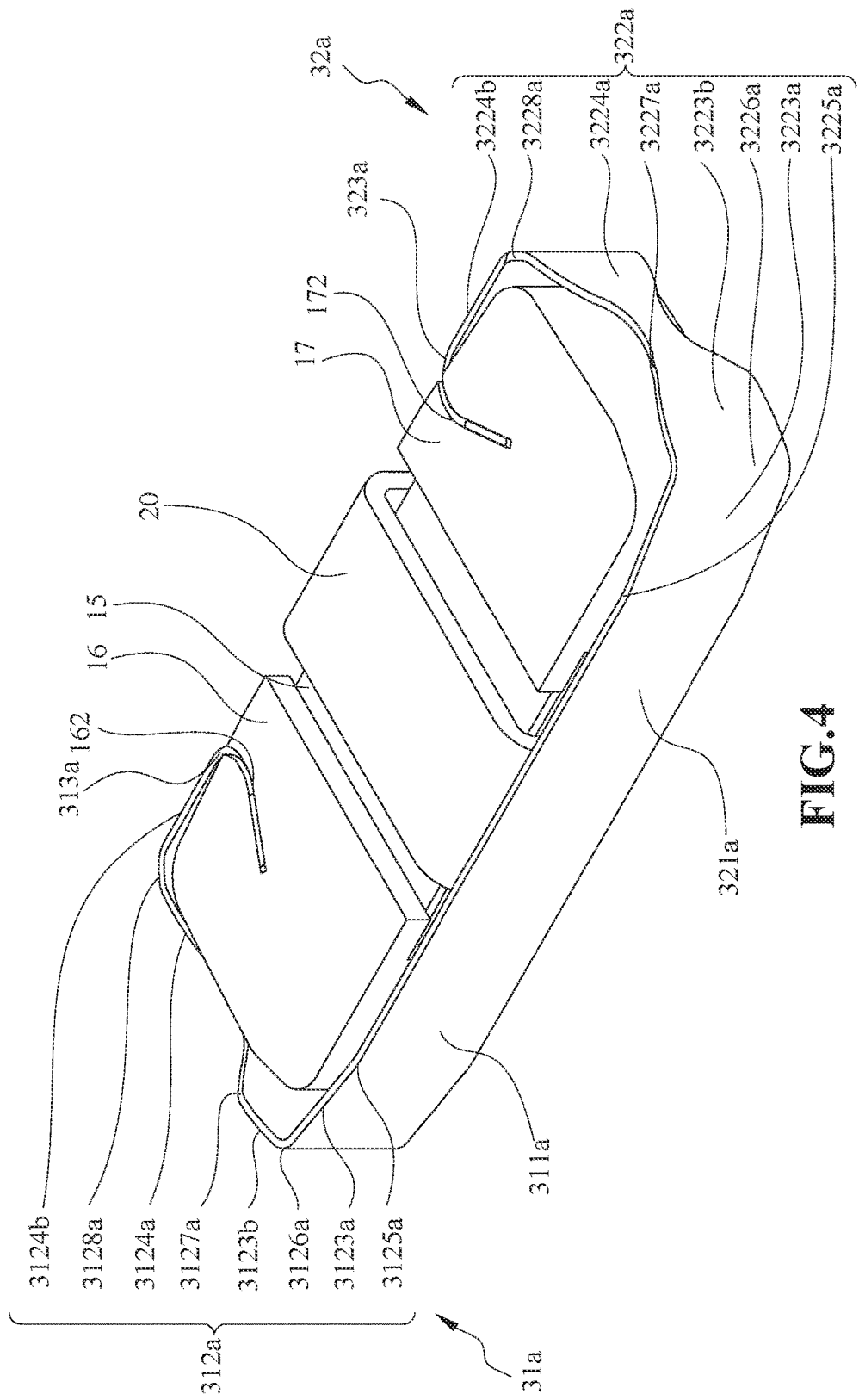
FIG. 4 shows a schematic view of the linear resonant actuator with elastic suspension system in accordance with a second exemplary embodiment.
Figure 5:
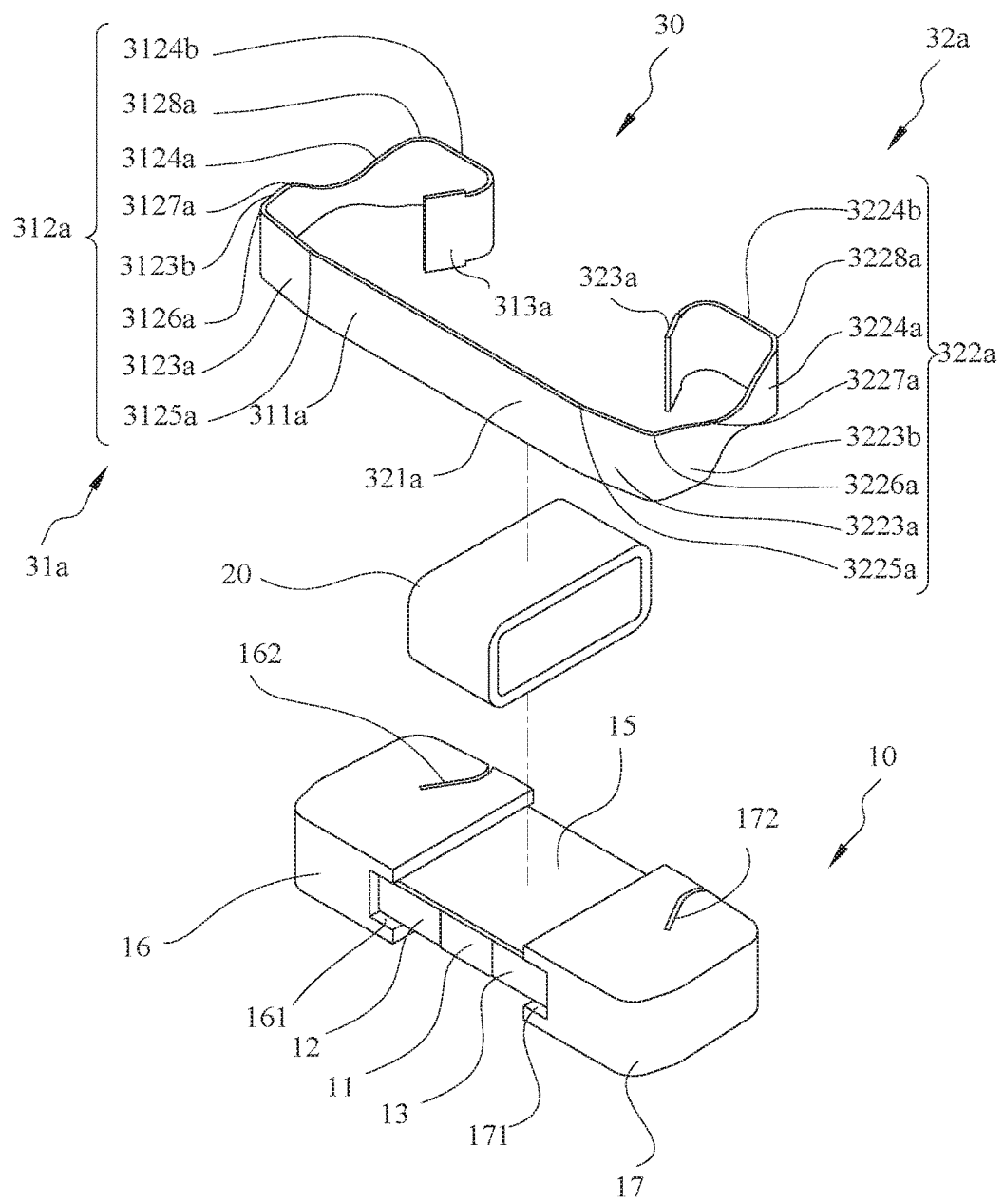
FIG. 5 shows a dissected view of the linear resonant actuator with elastic suspension system in accordance with a second exemplary embodiment.
Figure 6:
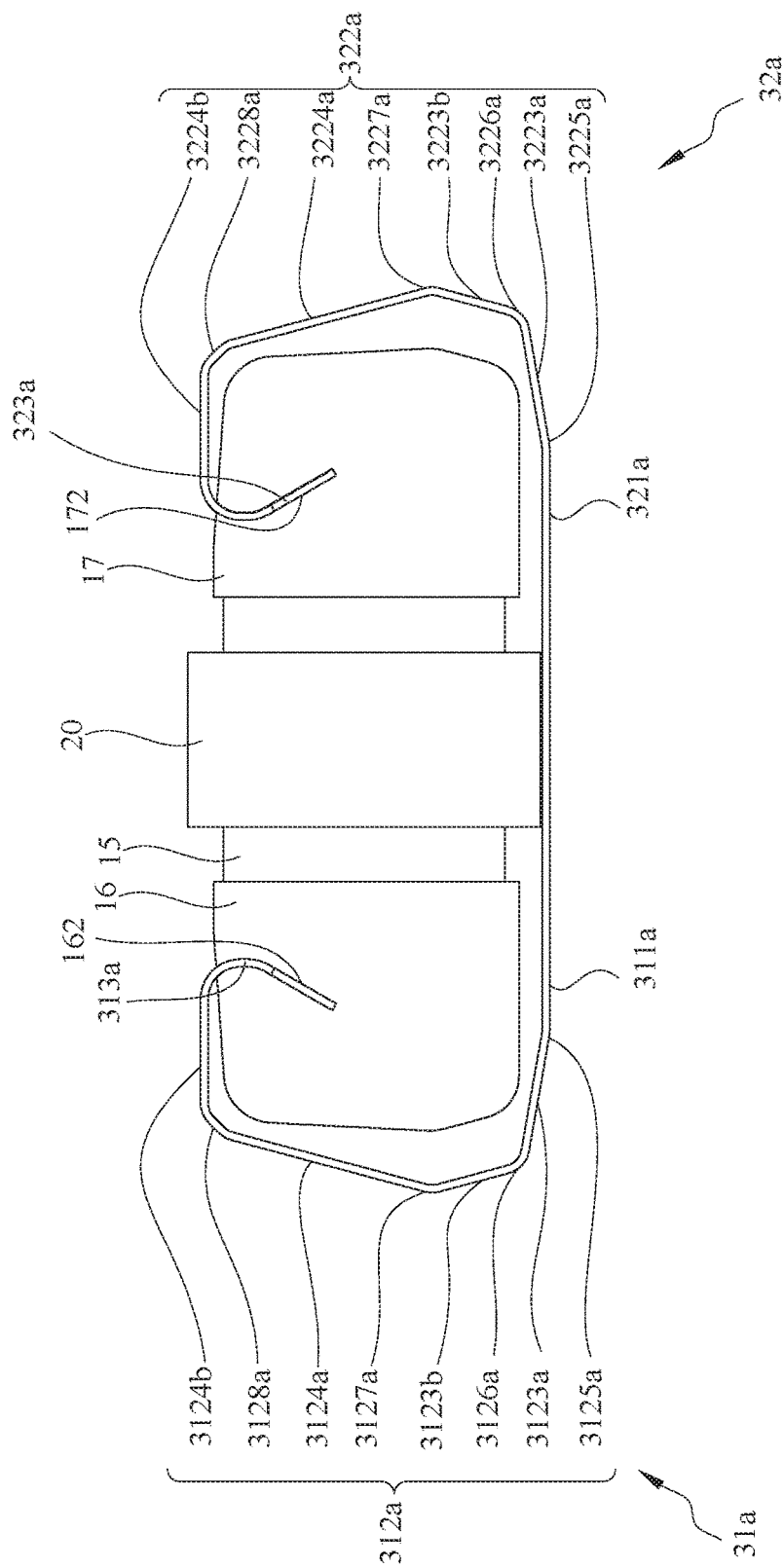
FIG. 6 shows a side view of the linear resonant actuator with elastic suspension system in accordance with a second exemplary embodiment.

Refer to FIGS. 4-5. FIG. 4 shows a schematic view of the linear resonant actuator with elastic suspension system in accordance with a second exemplary embodiment; FIG. 5 shows a dissected view of the linear resonant actuator with elastic suspension system in accordance with a second exemplary embodiment; and FIG. 6 shows a side view of the linear resonant actuator with elastic suspension system in accordance with a second exemplary embodiment. The second embodiment is similar to the first embodiment, with the difference that the elastic suspension system 30a is slightly different from the elastic suspension system 30 in the first embodiment. More specifically, the first suspension portion 312a comprises: two first outward extensions 3123a, 3123b and two first inward extensions 3124a, 3124b; the second suspension portion 322a comprises: two second outward extensions 3223a, 3223b and two second inward extensions 3224a, 3224b. Moreover, one of the first outward extensions 3123a extends outwards between the first fixed portion 311a and the other first inward extension 3123b, with a bend 3125a between the one first outward extension 3123a and the first fixed portion 311a; the other first outward 3123b extension extends outwards between the one first outward extension 2123a and one of the first inward extension 2124a, with a bend 3126a between the one first outward extension 3123a and the other first outward extension 3123b; one of the first inward extensions 3124a extends inwards between the other first outward extension 3124b and the other first inward extension 3124b, with a bend 3127a between the other first outward extension 3123b and the one first inward extension 3124a; the other first inward extension 3124b extends inwards between the one first outward extension 3124a and the first engaging portion 313a, with a bend 3128a between the one first inward extension 3124a and the other first inward extension 3124b. One of the second outward extensions 3223a extends outwards between the second fixed portion 321a and the other second outward extension 3223b, with a bend 3225a between the one second outward extension 3223a and the second fixed portion 321a; the other second outward extension 3223b extends outwards between the one second outward extension 3223a and one of the second inward extensions 3224a, with a bend 3226a between the one second outward extension 3223a and the other second outward extension 3223b; one of the second inward extension 3224a extends inwards between the other second outward extension 3223b and the other second inward extension 3224b, with a bend 3227a between the other second outward extension 3223b and the one second inward extension 3224a; the other second inward extension 3224b extends inwards between the one second inward extension 3224a and the second engaging portion 323, with a bend 3228a between the one second inward extension 3224a and the other second inward extension 3224b; wherein the angle at the bend 3125a between the one first outward extension 3123a and the first fixed portion 311a is equal to the angle at the bend 3225a between the one second outward extension 3223a and the second the fixed portion 321a; the angle at the bend 3126a between the two first outward extensions 3123a, 3123b is equal to the angle at the bend 3226a between the two second outward extensions 3223a, 3223b; the angle at the bend 3127a between the other first outward extension 3123b and the one first inward extension 3124a is equal to the angle at the bend 3227a between the other second outward extension 3223b and the one second inward extension 3224a; the angle at the bend 3128a between the two first inward extensions 3124a, 3124b is equal to the angle at the bend 3228a between the two second inward extensions 3224a, 3224b. Preferably, both the angle at the bend 3125a between the one first outward extension 3123a and the first fixed portion 311a and the angle at the bend 3225a between the one second outward extension 3223a and the second the fixed portion 321a are 170°; both the angle at the bend 3126a between the two first outward extensions 3123a, 3123b and the angle at the bend 3226a between the two second outward extensions 3223a, 3223b are 115°; both the angle at the bend 3127a between the other first outward extension 3123b and the one first inward extension 3124a and the angle at the bend 3227a between the other second outward extension 3223b and the one second inward extension 3224a are 150°; and both the angle at the bend 3128a between the two first inward extensions 3124a, 3124b and the angle at the bend 3228a between the two second inward extensions 3224a, 3224b are 105°. Preferably, the one first outward extension 3123a near the first fixed portion 311a has a length greater than the other first outwards extension 3123b away from the first fixed portion 311a, the one first outward extension 3123a has a length less than the one first inward extension 3124a away from the first engaging portion 313a, the one first inward extension 3124a away from the first engaging portion 313a has a length greater than the other first inward extension 3124b near the first engaging portion 313a; the one second outward extension 3223a near the second fixed portion 321a has a length greater than the other second outwards extension 3223b away from the second fixed portion 321a, the one second outward extension 3223a has a length less than the one second inward extension 3224a away from the second engaging portion 323a, the one second inward extension 3224a away from the second engaging portion 323a has a length greater than the other second inward extension 3224b near the second engaging portion 323a; wherein the one first outward extension 3123a near the first fixed portion 311a and the one second outward extension 3223a near the second fixed portion 321a have the same length; the other first outward extension 3123b away from the first fixed portion 311a and the other second outward extension 3223b away from the second fixed portion 321a have the same length; the one first inward extension 3124a away from the first engaging portion 313a and the one second inward extension 3224a away from the second engaging portion 323a have the same length; the other first inward extension 3124b near the first engaging portion 313a and the other second inward extension 3224b near the second engaging portion 323a have the same length.

In summary, the second embodiment of the present invention has the same structure as that of the first embodiment except that the structure of the aforementioned suspension portion, which is slightly different from that of the first embodiment. Moreover, the second embodiment of the present invention not only achieves the effect achieved in the first embodiment, but can also make the elastic suspension system 30a protrude less away from the movable structure 10 than the elastic suspension system 30 in the first embodiment because the elastic suspension system 30a in the second embodiment has more bends than the elastic suspension system 30 in the first embodiment. As such, the overall size of the elastic suspension system 30a in the second embodiment is smaller than the elastic suspension system 30 in the first embodiment. When built in inside a portable electronic product, the elastic suspension system 30a in the second embodiment uses less space than the elastic suspension system 30 in the first embodiment.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A linear resonant actuator (LRA) with elastic suspension system, comprising:
   a movable structure, comprising a magnetic-permeable element and two magnets, with the two magnets disposed at two opposite sides of the magnetic-permeable element;
   a coil, surrounding the magnetic-permeable element; and
   an elastic suspension system, comprising: a first elastic sheet and a second elastic sheet; the first elastic sheet comprising a first fixed portion, a first suspension portion and a first engaging portion, the first suspension portion being disposed between the first fixed portion and the first engaging portion and comprising a plurality of bends, the bends of the first suspension portion being greater than 90°, and the first engaging portion being disposed at one end of the movable structure; the second elastic sheet comprising a second fixed portion, a second suspension portion and a second engaging portion, the second suspension portion being disposed between the second fixed portion and the second engaging portion and comprising a plurality of bends, the bends of the second suspension portion being greater than 90°, and the second engaging portion being disposed at the other end of the movable structure;
   wherein the first elastic sheet and the second elastic sheet are symmetrical; and
      wherein the first suspension portion comprises: a first outward extension and a first inward extension; the first outward extension extending outwards between the first fixed portion and the first inward extension, with a bend between the first outward extension and the first fixed portion; the first inward extension extending inwards between the first outward extension and the first engaging portion, with a bend between the first outward extension and the first inward extension;
   wherein the second suspension portion comprises: a second outward extension and a second inward extension; the second outward extension extending outwards between the second fixed portion and the second inward extension, with a bend between the second outward extension and the second fixed portion; the second inward extension extending inwards between the second outward extension and the second engaging portion, with a bend between the second outward extension and the second inward extension;
   wherein an angle at the bend between the first outward extension and the first fixed portion is equal to an angle at the bend between the second outward extension and the second fixed portion; an angle at the bend between the first outward extension and the first inward extension is equal to an angle at the bend between the second outward extension and the second inward extension.

2. The linear resonant actuator with elastic suspension system as claimed in claim 1, wherein the angle at the bend between the first outward extension and the first fixed portion is greater than the angle at the bend between the first outward extension and the first inward extension; and the angle at the bend between the second outward extension and the second fixed portion is greater than the angle at the bend between the second outward extension and the second inward extension.

3. The linear resonant actuator with elastic suspension system as claimed in claim 2, wherein both the angle at the bend between the first outward extension and the first fixed portion and the angle at the bend between the second outward extension and the second the fixed portion are 115°; both the angle at the bend between the first outward extension and the first inward extension and the angle at the bend between the second outward extension and the second inward extension are 95°.

4. The linear resonant actuator with elastic suspension system as claimed in claim 2, wherein the first outward extension has a length greater than the first inward extension, the second outward extension has a length greater than the second inward extension, the first outward extension and the second outward extension have the same length, and the first inward extension and the second inward extension have the same length.

5. The linear resonant actuator with elastic suspension system as claimed in claim 1, wherein the movable structure comprises two magnet fixtures, with at least a portion of each magnet disposed in a magnet fixture respectively; each magnet fixture is disposed with a groove, and the first engaging portion and the second engaging portion are hook-shaped and embedded respectively into the grooves of the two magnet fixtures.

6. The linear resonant actuator with elastic suspension system as claimed in claim 5, wherein the first fixed portion and the second fixed portion are disposed at the same side of the two magnet fixtures, and the two grooves are disposed respectively at a side of the two magnet fixtures away from the first fixed portion and the second fixed portion.

7. The linear resonant actuator with elastic suspension system as claimed in claim 6, wherein the first fixed portion and the second fixed portion are integrated monolithically.

8. The linear resonant actuator with elastic suspension system as claimed in claim 5, wherein each magnet fixture is disposed with a holding slot, and outer sides of the two magnets are accommodated respectively in the holding slots of the two magnet fixtures.

9. The linear resonant actuator with elastic suspension system as claimed in claim 8, wherein the movable structure comprises a magnet base, disposed on top of the magnetic-permeable element and the two magnets, with outer side accommodated respectively in the holding slot of the two magnet fixtures.

10. A linear resonant actuator (LRA) with elastic suspension system, comprising:
   a movable structure, comprising a magnetic-permeable element and two magnets, with the two magnets disposed at two opposite sides of the magnetic-permeable element;
   a coil, surrounding the magnetic-permeable element; and
   an elastic suspension system, comprising: a first elastic sheet and a second elastic sheet the first elastic sheet comprising a first fixed portion, a first suspension portion and a first engaging portion, the first suspension portion being disposed between the first fixed portion and the first engaging portion and comprising a plurality of bends, the bends of the first suspension portion being greater than 90°, and the first engaging portion being disposed at one end of the movable structure; the second elastic sheet comprising a second fixed portion, a second suspension portion and a second engaging portion, the second suspension portion being disposed between the second fixed portion and the second engaging portion and comprising a plurality of bends, the bends of the second suspension portion being greater than 90°, and the second engaging portion being disposed at the other end of the movable structure; wherein the first elastic sheet and the second elastic sheet are symmetrical; and
   wherein the first suspension portion comprises: two first outward extensions and two first inward extensions; one of the first outward extensions extending outwards between the first fixed portion and the other first inward extension, with a bend between the one first outward extension and the first fixed portion; the other first outward extension extending outwards between the one first outward extension and one of the first inward extension, with a bend between the one first outward extension and the other first outward extension; one of the first inward extensions extending inwards between the other first outward extension and the other first inward extension, with a bend between the other first outward extension and the one first inward extension; the other first inward extension extending inwards between the one first outward extension and the first engaging portion, with a bend between the one first inward extension and the other first inward extension;
   wherein the second suspension portion comprises: two second outward extensions and two second inward extensions; one of the second outward extensions extending outwards between the second fixed portion and the other second outward extension, with a bend between the one second outward extension and the second fixed portion; the other second outward extension extending outwards between the one second outward extension and one of the second inward extensions, with a bend between the one second outward extension and the other second outward extension; one of the second inward extension extending inwards between the other second outward extension and the other second inward extension, with a bend between the other second outward extension and the one second inward extension; the other second inward extension extending inwards between the one second inward extension and the second engaging portion, with a bend between the one second inward extension and the other second inward extension;
   wherein an angle at the bend between the one first outward extension and the first fixed portion is equal to an angle at the bend between the one second outward extension and the second fixed portion; an angle at the bend between the two first outward extensions is equal to an angle at the bend between the two second outward extensions; the angle at the bend between the other first outward extension and the one first inward extension is equal to the angle at the bend between the other second outward extension and the one second inward extension; the angle at the bend between the two first inward extensions is equal to the angle at the bend between the two second inward extensions.

11. The linear resonant actuator with elastic suspension system as claimed in claim 10, wherein both the angle at the bend between the one first outward extension and the first fixed portion and the angle at the bend between the one second outward extension and the second the fixed portion are 170°; both the angle at the bend between the two first outward extensions and the angle at the bend between the two second outward extensions are 115°; both the angle at the bend between the other first outward extension and the one first inward extension and the angle at the bend between the other second outward extension and the one second inward extension are 150°; and both the angle at the bend between the two first inward extensions and the angle at the bend between the two second inward extensions are 105°.

12. The linear resonant actuator with elastic suspension system as claimed in claim 10, wherein the one first outward extension near the first fixed portion has a length greater than the other first outwards extension away from the first fixed portion, the one first outward extension has a length less than the one first inward extension away from the first engaging portion, the one first inward extension away from the first engaging portion has a length greater than the other first inward extension near the first engaging portion;

the one second outward extension near the second fixed portion has a length greater than the other second outwards extension away from the second fixed portion, the one second outward extension has a length less than the one second inward extension away from the second engaging portion, the one second inward extension away from the second engaging portion has a length greater than the other second inward extension near the second engaging portion;

wherein the one first outward extension near the first fixed portion and the one second outward extension near the second fixed portion have the same length; the other first outward extension away from the first fixed portion and the other second outward extension away from the second fixed portion have the same length; the one first inward extension away from the first engaging portion and the one second inward extension away from the second engaging portion have the same length; the other first inward extension near the first engaging portion and the other second inward extension near the second engaging portion have the same length.

* * * * *